March 8, 1966    D. M. CHISEL    3,239,150
THRUST VECTOR CONTROL
Filed Nov. 29, 1961
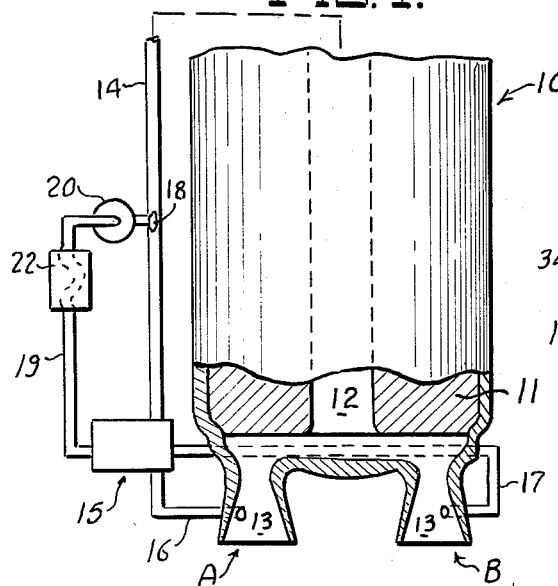
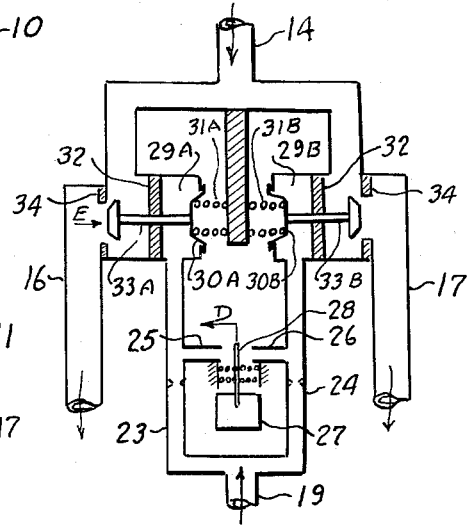
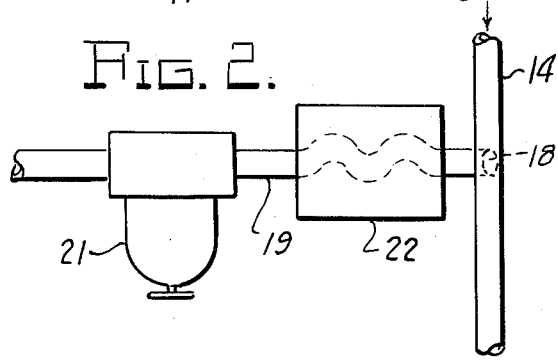
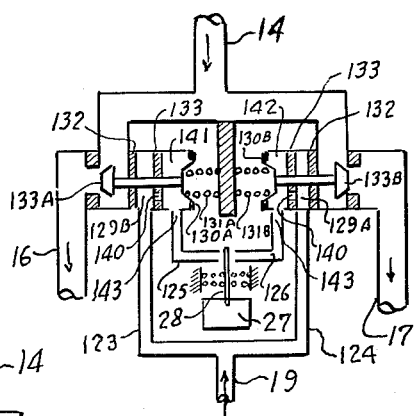
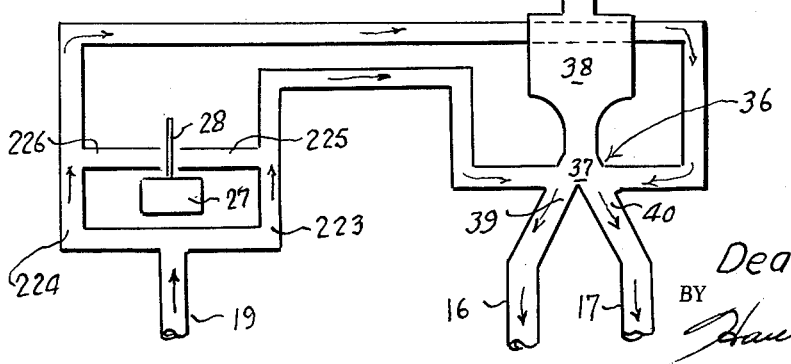
INVENTOR.
Dean M. Chisel
BY
Hauke & Hauke
ATTORNEYS 3,239,150
THRUST VECTOR CONTROL
Dean M. Chisel, Seattle, Wash., assignor to Continental Aviation and Engineering Corporation, Detroit, Mich., a corporation of Virginia
Filed Nov. 29, 1961, Ser. No. 155,767
7 Claims. (Cl. 239—265.23)

This invention relates to a thrust vector deflector for rockets, missiles and the like. More particularly it pertains to a method of deflecting the thrust vector of such space vehicles by injecting liquid or gas into the exhaust stream.

Thrust deflectors are generally intended to be utilized as attitude control means for all types of space vehicles and missile systems including satellite interceptors, antimissile systems, and spaceship rendezvous vehicles. Devices frequently used for this purpose include jet tabs, jetavators, auxiliary rockets, and gimballed motors. Each of these, however, has important disadvantages. Jet tabs and jetavators require considerable operating power and are severely limited by the higher exhaust gas temperatures incurred in the larger rockets now being produced. Auxiliary rockets, on the other hand, are complex and contribute to failures thus lessening the reliability of missile systems employing this means of thrust deflection. Gimballing is impractical for most of the solid propellant and large liquid propellant rockets because of the heavy masses which must be positioned quickly and the added power necessary to accomplish this.

A new method of thrust deflection under consideration is the injection of a gas or liquid stream into the path of the rocket exhaust gas stream. The injection of such a stream into the divergent section of an exhaust nozzle for example creates a compression wave which acts to deflect the flow of the main exhaust stream. Such a method may be utilized in larger rockets since it requires little additional power and it is not affected by exhaust temperatures. The present method utilizes the injectant of the hot combustion gases of the rocket motor into the main rocket nozzles to create the desired thrust deflection. Such a system has the advantage that weight in the form of the injectant is not added to the space vehicle.

An object of the present invention then is to provide a method of controlling thrust deflection which utilizes the injection of hot combustion gases of the rocket motor into its exhaust flow.

Another object is to provide a thrust deflector system which utilizes hot combustion gases but which is at the same time essentially contaminant insensitive by providing from the same source cleaned and cooled servo gas to serve the operating mechanism.

Still another object is to provide a thrust control system which is relatively simple in construction and therefore does not detract from the reliability of the missile system incorporating it.

Yet another object of the present invention is to provide a thrust deflection system which adds little weight to the missile employing it.

Still further objects and advantages of the present invention will be apparent upon reference to the following drawings in which like characters refer to like parts throughout the several views and in which:

FIG. 1 is a diagrammatic view of a thrust control system embodying the present invention.

FIG. 2 is a diagrammatic view showing a preferred modification of the system in FIG. 1.

FIG. 3 is a diagrammatic view of a preferred servo system of the present invention.

FIG. 4 is a diagrammatic view of another preferred servo system of the present invention and FIG. 5 is a diagrammatic view of still another preferred servo system of the present invention.

Referring now to the drawings for a more detailed description of the present invention, FIG. 1 illustrates diagrammatically a preferred thrust control system. The particular system illustrated is designed for a rocket motor booster but it will be apparent from the following description that it could be incorporated into many other types and sizes of reaction motors.

FIG. 1 shows a rocket vehicle 10 as preferably carrying solid fuel 11 and having a combustion chamber 12. Exhaust nozzles A and B each provided with a throat section 13 provide outlets for exhaust gases to escape the combustion chamber providing thrust for the vehicle. Though the rocket 10 is shown to have two exhaust nozzles A and B, it should be apparent that the number of these utilized is only important insofar as some modification of the system may be required. It will work effectively regardless of the number of nozzles employed. A hot gas injectant duct 14 provides a passageway for some of the exhaust gases to escape the combustion chamber 12 and be directed to diverter apparatus 15. This gas becomes the injectant stream. Conduit 16 leads from the diverter 15 to nozzle A and conduit 17 leads from the diverter 15 to the nozzle B. The conduits 16 and 17 are disposed to open downstream of the throat 13 of the nozzles A and B at an angle with respect to the normal flow of exhaust gases through these nozzles. The diverter apparatus 15 is operable to regulate flow of exhaust gases through the conduits 16 and 17 and thus regulate the flow of the injectant into the nozzles A and B.

Upstream of the diverter apparatus 15 the hot gas duct 14 is provided with a reverse flow intake orifice 18 which permits a portion of the exhaust gases to be siphoned off to serve as a servo gas supply. A servo gas conduit 19 directs the flow of gases entering the intake orifice 18. Because of the reverse direction of the intake orifice 18 and the high inertia of the contaminant particles in the combustion gases the gas which enters the servo conduit 19 will be relatively clean and contaminant free. To further insure clean servo gas any preferred cleaning device can be installed in the servo conduit 19 such as a centrifugal type cleaner 20 indicated in FIG. 1 or a filter 21 as indicated in FIG. 2. Each of these are well known in the art and need not be described. The servo gas is preferably cooled by any convenient means such as a lithium hydride heat sink 22. It will be noted that if a filter 21 is used to clean the servo gas, the gas is preferably cooled before it is cleaned whereas if a cyclone or centrifugal type cleaner 20 is used, the cooling may occur after the cleaning. The servo conduit 19 also leads to the diverter apparatus 15 and this will now be described in detail.

FIG. 3 illustrates a preferred servo system in which the servo conduit 19 is forked to provide a pair of branches 23 and 24. The branches 23 and 24 are provided with bleed lines 25 and 26 respectively. A torque motor 27 operably carries a flapper valve 28 which is disposed intermediate the bleed lines 25 and 26. The flapper valve 28 is operable to regulate the escape of servo gas from the bleed lines 25 and 26. The conduit branches 23 and 24 direct the flow of servo gas respectively to chambers 29A and 29B, which have at one end diaphragms 30A and 30B preferably urged inwardly by spring members 31A and 31B. Heat resistant dams 32, of any suitable material such as graphite, define the other ends of the chambers 29A and 29B and provide guides for valves 33A and 33B disposed to regulate the flow of the injectant gas from the hot gas duct 14 into the conduits 16 and 17 which lead to the nozzles A and B. Heat resistant seats 34 for the valves 33A and 33B are preferably provided at the mouths of the conduits 16 and 17 and may be of any suitable heat resistant material such as tungsten carbide.

The operation of the flapper valve 28 in response to a signal received by the torque motor 27 in the direction indicated by the arrow at D in FIG. 3 cuts off the escape of servo gas from the bleed line 25 thereby increasing pressure in the branch line 23. This produces a pressure in the chamber 29A which the diaphragm 30A translates to movement of the valve 33A toward an open position. This is indicated by the arrow at E in FIG. 3. This movement of the valve 33A acts to increase flow of injectant gas into the conduit 16. This increase in flow through conduit 16 produces a differential in injectant pressures at the nozzles A and B. In this manner, the desired thrust control may be achieved since the increase in flow can be directed to nozzle B by an opposite movement of the flapper valve 28.

FIG. 4 illustrates another preferred servo system substantially similar to the one described above except as follows: The servo conduit 19 is again forked to provide a pair of branches 123 and 124. The branches 123 and 124 direct the flow of servo gas respectively to the chambers 129B and 129A which are in the present case defined by the thermal dams 133 at one end and thermal dams 132 at the other. The thermal dams 133 are each provided with an orifice 140 which communicate with pressure chambers 141 and 142. The chambers 141 and 142 are defined at one end by the thermal dams 133 and at the other by the diaphragms 130A and 130B. The diaphragms 130A and 130B are preferably urged inwardly by spring members 131A and 131B. The thermal dams 132 and 133 act as guides for valves 133A and 133B disposed to regulate the flow of injectant gas from the hot gas duct 14 into the conduits 16 and 17 which lead to the nozzles A and B.

The diaphragm chambers 141 are each provided with an outlet 143 opening to bleed lines 125 and 126. A torque motor 27 operably carries a flapper valve 28 disposed intermediate the bleed lines 125 and 126. The flapper valve 28 is operable to regulate the escape of servo gas from the bleed lines 125 and 126 and thus create a pressure differential in the chambers 141 and 142. This pressure differential operates through the diaphragms 130A and 130B and valves 133A and 133B to regulate the flow of the injectant gases through the conduits 16 and 17 producing the previously described thrust deflection.

FIG. 5 illustrates still another preferred servo system in which the valve mechanism which regulates the flow of injectant gases from the hot gas duct 14 to the conduits 16 and 17 has been replaced by a much simpler structure. Branch lines 223 and 224 lead the servo gas from the conduit 19 to opposite sides of a Y shaped diverter member 36. The diverter 36 is provided with a throat portion 37 which is disposed intermediate an inlet portion 38 communicating with the gas duct 14 and a pair of outlets 39 and 40 communicating with conduits 16 and 17 respectively. The branches 223 and 224 direct the flow of servo gas into the throat portion 37 of the diverter 36 at an angle with respect to the normal flow of gases through the throat portion 37. The flapper valve 28 operates substantially as above to selectively regulate the escape of servo gas from bleed lines 225 and 226 which produces a pressure differential in the branch lines 223 and 224. The effect of this pressure differential is to deflect the flow of injectant gases into either of the outlets 39 and 40 thus intensifying the injectant stream at either nozzle A or nozzle B. The principle used in diverting the flow of injectant gases then is the same principle which is used to deflect the exhaust gases at the nozzles and thus achieve the desired thrust control.

It is apparent from the above description that a number of important advantages are achieved by the present invention. The hot exhaust gases may be used as an injectant with an insignificant amount of energy loss due to the escape of servo gas through the bleed lines 25 and 26. At maximum operating conditions, the servo flow is less than one half of one percent of the total main exhaust flow. Hot gas sealing problems are practically nonexistent. There are no sliding fit close tolerance hot gas seals required. For example, in the system shown in FIG. 4, the only hot gas seals are the graphite dams 132 across which there is a low pressure drop. This reduces pressure loads and leakage. Any leakage which does occur will merely dilute the servo supply. This dilution will not hamper the performance of the servo system.

Further, the system is essentially contaminant insensitive. The servo gas is cleaned by a single aerodynamic reverse intake and a cyclone separator and/or a filter. Complex moving parts are not in contact with the high temperature heavily contaminated injectant gases. The actuator diaphragm, where utilized, servo line and torque motor are all cooled by the pre-cooled servo gas.

The significant feature of the preferred system illustrated by FIG. 5 is its ability to divert, under controlled conditions, gas from duct 14 without any life or performance limitations imposed by high gas temperature gas contamination. This insensitivity to gas temperature or contamination is unique when compared to other systems which use mechanical devices for diversion methods. This system will therefore have unlimited growth potential for future high performance rockets.

While I have described only a few embodiments of the present invention, it is apparent from the foregoing description that many other changes and modifications could be made without departing from the spirit of the invention or the scope of the following claims.

I claim:

1. In combination with a reaction motor having a combustion chamber and an exhaust nozzle, a thrust vector control system comprising,
    (a) an injectant gas duct communicating with said combustion chamber and being provided with at least two branch ducts positioned to discharge combustion gases into said nozzle angularly with respect to normal flow of exhaust gases through said nozzle,
    (b) valve means carried in each of said branch ducts for varying combustion gas flow therethrough,
    (c) a conduit communicating with said injectant gas duct upstream of said branch ducts for diverting a portion of the combustion gases from said injectant duct,
    (d) said conduit being forked to provide a pair of branch lines,
    (e) a cooling means and a cleaning means disposed in said conduit upstream of said branch lines whereby the combustion gases diverted to said conduit are cooled and cleaned before delivery to said branch lines,
    (f) means selectively varying the pressure of the combustion gases in each of said branch lines, and
    (g) pressure responsive means communicating with said branch lines and connected with said valve means and operable to vary the position of said valve means in response to pressure differential changes produced in said branch lines to thereby vary combustion gas flow through said branch ducts.

2. The system as defined in claim 1 and in which said cooling means comprises a lithium hydride heat sink disposed in said conduit upstream of said branch lines.

3. The system as defined in claim 1 and in which said cleaning means comprises a centrifugal separator disposed in said conduit upstream of said branch lines.

4. The system as defined in claim 1 and in which said cleaning means comprises a filter disposed in said conduit upstream of said branch lines.

5. The system as defined in claim 1 and in which said pressure varying means comprises
    (a) a torque motor,
    (b) a flapper valve operably connected to said torque motor, (c) a bleed line extending from each of said branch lines,
(d) said flapper valve being selectively actuated by said torque motor to vary the flow from each of said bleed lines whereby a pressure differential is created in said branch lines.

6. The system as defined in claim 1 and in which
(a) said pressure responsive means comprises means defining a chamber, a diaphragm means movably carried in said chamber, means connecting said branch lines with said chamber on opposite sides of said diaphragm means whereby said diaphragm means is sensitive to changes in the pressure differential in said branch lines and movable within said chamber in response to changes in pressure differential in said branch lines, and
(b) said valve means comprising a valve carried in each of said branch ducts and being connected with said diaphragm to be moved therewith whereby pressure differentials produced in said branch lines by said pressure varying means are translated by said diaphragm to movement of said valves to thereby regulate flow of combustion gases through said branch ducts.

7. The system as defined in claim 1 and in which
(a) each of said branch lines is provided with a bleed line,
(b) said pressure varying means comprises a valve disposed between said bleed lines and being operable to regulate flow from said bleed lines,
(c) said pressure responsive means comprising means defining a chamber connected with said branch lines, a diaphragm movable in said chamber and having opposite sides registering with said branch lines, and
(d) said valve means being disposed in said branch ducts and being operably connected with said diaphragm whereby upon movement of said diaphragm in response to changes in the pressure differential produced in said branch lines, said valve means are actuated to positions regulating flow of combustion gases through said branch ducts.

References Cited by the Examiner

UNITED STATES PATENTS

| | | | |
|---|---|---|---|
| 2,942,687 | 6/1960 | Kollander | 60—29 X |
| 3,000,178 | 9/1961 | Logerot | 60—35.6 |
| 3,005,533 | 10/1961 | Wadey | 137—83 X |
| 3,020,709 | 2/1962 | Bertin et al. | 60—35.6 |
| 3,026,806 | 3/1962 | Runton et al. | |
| 3,034,628 | 5/1962 | Wadey | 137—83 X |
| 3,036,430 | 5/1962 | Eggers et al. | 60—35.54 |
| 3,045,596 | 7/1962 | Rae | 60—35.54 X |
| 3,058,304 | 10/1962 | Corbett | 60—35.54 X |
| 3,101,591 | 8/1963 | Wise | 60—35.54 |
| 3,115,887 | 12/1963 | McCorkle | 60—35.54 X |
| 3,135,291 | 6/1964 | Kepler et al. | 60—35.54 |
| 3,143,856 | 8/1964 | Hausmann | 60—35.54 |

FOREIGN PATENTS

| | | |
|---|---|---|
| 1,197,701 | 6/1959 | France. |
| 822,299 | 10/1959 | Great Britain. |

OTHER REFERENCES

German application No. 1,107,514, May 25, 1961.

"Reaction Controllers Maintain Attitude of Space Vehicles," appearing in Control Engineering, vol. 7, No. 1, January 1960, p. 151.

MARK NEWMAN, *Primary Examiner.*

SAMUEL LEVINE, *Examiner.*